United States Patent
Yamamoto et al.

(10) Patent No.: US 11,167,637 B2
(45) Date of Patent: Nov. 9, 2021

(54) FUEL FILLER STRUCTURE FOR FUEL TANK

(75) Inventors: Satoshi Yamamoto, Nagoya (JP); Chiaki Kataoka, Nagakute (JP); Masaki Akagi, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 242 days.

(21) Appl. No.: 14/390,693

(22) PCT Filed: Apr. 12, 2012

(86) PCT No.: PCT/JP2012/060043
§ 371 (c)(1),
(2), (4) Date: Oct. 3, 2014

(87) PCT Pub. No.: WO2013/153658
PCT Pub. Date: Oct. 17, 2013

(65) Prior Publication Data
US 2015/0083722 A1    Mar. 26, 2015

(51) Int. Cl.
*B60K 15/04*    (2006.01)

(52) U.S. Cl.
CPC ...... *B60K 15/04* (2013.01); *B60K 2015/0429* (2013.01); *B60K 2015/0461* (2013.01)

(58) Field of Classification Search
CPC .............. B65K 15/04; B65K 15/0406; B60K 2015/0429
USPC ....................................... 220/86.2
See application file for complete search history.

(56) References Cited

U.S. PATENT DOCUMENTS

| | | | |
|---|---|---|---|
| 6,805,159 B2 * | 10/2004 | Beaulne | B60K 15/04 137/588 |
| 2005/0034269 A1 * | 2/2005 | Jinbo | E05D 11/1007 16/51 |
| 2009/0189106 A1 | 7/2009 | Hagano et al. | |
| 2012/0312420 A1 * | 12/2012 | Kataoka et al. | 141/350 |
| 2013/0327768 A1 * | 12/2013 | Kataoka et al. | 220/86.2 |

FOREIGN PATENT DOCUMENTS

| | | |
|---|---|---|
| DE | 102008054493 A1 * | 7/2009 |
| JP | A-2000-006675 | 1/2000 |
| JP | A-2009-173149 | 8/2009 |

* cited by examiner

*Primary Examiner* — Anthony D Stashick
*Assistant Examiner* — Blaine G Neway
(74) *Attorney, Agent, or Firm* — Oliff PLC (57) ABSTRACT

To obtain a fuel filler structure for a fuel tank wherein when causing an opening and closing valve to close, it can be ensured that the opening and closing valve does not rapidly rotate to a closed position in which it closes a fuel fill inlet, and when causing the opening and closing valve to open, the opening and closing valve can be opened with a small force. A fuel filler structure is equipped with a damper on the near side of a flapper valve in the insertion direction of a fuel nozzle. When the flapper valve rotates to an open position, the damper does not act on the flapper valve, and when the flapper valve rotates to a closed position, the damper acts on the flapper valve.

5 Claims, 10 Drawing Sheets

FUEL FILLER STRUCTURE FOR FUEL TANK

TECHNICAL FIELD

The present invention relates to a fuel filler structure for a fuel tank.

BACKGROUND ART

As a fuel filler structure for fueling the fuel tank of an automobile, for example, there is a fuel filler structure configured in such a way that the fuel fill inlet, into which the fuel nozzle is inserted, can be opened and closed by an opening and closing valve such as a flapper valve. For example, in Japanese Patent Application Laid-open (JP-A) No. 2009-173149 (patent document 1), there is described a tank opening and closing device equipped with an opening and closing startup mechanism for causing an opening and closing member of a valve opening mechanism that closes an inlet to open.

In this connection, when causing the opening and closing member (opening and closing valve) to close, ensuring that the opening and closing member does not rapidly rotate to the closed position in which it closes the fuel fill inlet, and when causing the opening and closing member to open, ensuring that the opening and closing valve is opened with a small force has been desired.

DISCLOSURE OF INVENTION

Technical Problem

In consideration of the above-described circumstances, it is a problem of the present invention to obtain a fuel filler structure for a fuel tank wherein when causing the opening and closing valve to close, it can be ensured that the opening and closing valve does not rapidly rotate to the closed position in which it closes the fuel fill inlet, and when causing the opening and closing valve to open, the opening and closing valve can be opened with a small force.

Solution to Problem

A fuel filler structure for a fuel tank of a first aspect of the present invention comprises: a fuel fill inlet member that is equipped with a fuel fill inlet into which a fuel nozzle for fueling a fuel tank is inserted; an opening and closing valve that can open and close the fuel fill inlet; a valve shaft for attaching the opening and closing valve to the fuel fill inlet member in such a way that the opening and closing valve can rotate between a closed position, in which it closes the fuel fill inlet, and an open position, in which it opens the fuel fill inlet as a result of being pushed by the fuel nozzle; a valve biasing member that biases the opening and closing valve from the open position to the closed position; and a damper which, when the opening and closing valve rotates from the open position to the closed position, contacts the opening and closing valve on a near side of the opening and closing valve in a direction in which the fuel nozzle is inserted into the fuel fill inlet member and generates resistance in the rotation of the opening and closing valve.

In the fuel filler structure for a fuel tank of the first aspect, the opening and closing valve is rotatably attached by the valve shaft to the fuel fill inlet member. The valve biasing member biases the opening and closing valve from the open position to the closed position, so normally the fuel fill inlet is closed by the opening and closing valve.

When the fuel nozzle is inserted into the fuel fill inlet, the opening and closing valve is pushed by the fuel nozzle. Then, the opening and closing valve rotates to the open position counter to the biasing force of the valve biasing member, so that the fuel fill inlet is opened.

When the fuel nozzle is pulled out from the fuel fill inlet, the opening and closing valve is no longer pushed by the fuel nozzle. Then, the opening and closing valve receives the biasing force of the valve biasing member and rotates from the open position to the closed position. At this time, the damper contacts the opening and closing valve and generates resistance in the rotation of the opening and closing valve. Because of this, the opening and closing valve can be suppressed from rapidly rotating to the closed position.

It is preferred that the action of the damper contacting the opening and closing valve and producing resistance in the rotation of the opening and closing valve take place at least just before the opening and closing valve reaches the closed position. That is, as long as the damper contacts the opening and closing valve just before the opening and closing valve reaches the closed position, the opening and closing valve can be suppressed from strongly hitting the fuel fill inlet member or the like in the closed position. However, the fuel filler structure may also have a configuration where the damper contacts the opening and closing valve only when the opening and closing valve is in the middle of moving from the open position to the closed position (so that the damper is away from the opening and closing valve just before the opening and closing valve reaches the closed position). That is, even with this configuration, the damper generates resistance in the rotation of the opening and closing valve during the time in which the damper contacts the opening and closing valve, so rapid rotation of the opening and closing valve can be suppressed.

The damper contacts the opening and closing valve from the near side in the direction in which the fuel nozzle is inserted into the fuel fill inlet member. When the opening and closing valve rotates from the closed position to the open position, the damper does not generate resistance in the rotation of the opening and closing valve. For this reason, the force needed to rotate the opening and closing valve from the closed position to the open position becomes smaller compared to a configuration in which the resistance of the damper acts on the opening and closing valve.

A fuel filler structure for a fuel tank of a second aspect of the present invention is the first aspect, wherein the damper has a damper contact piece that contacts the opening and closing valve, a damper shaft that is disposed on an insertion direction near side of, and parallel to, a rotational center of the valve shaft, and that is configured to rotatably attach the damper contact piece to the fuel fill inlet member, and a damper biasing member that biases the damper contact piece in a direction in which the damper contact piece contacts the opening and closing valve.

The damper contact piece is rotatably attached to the fuel fill inlet member by the damper shaft. Additionally, the damper contact piece is biased by the damper biasing member in the direction in which the damper contact piece contacts the opening and closing valve, so a state of contact can be maintained.

The damper shaft is disposed parallel to the valve shaft (the rotational center of the opening and closing valve), so when the opening and closing valve rotates, the opening and closing valve can rotate smoothly while maintaining a state of contact with the damper contact piece.

By giving the damper a configuration having the damper contact piece, the damper shaft, and the damper biasing member, the structure can be simplified.

A fuel filler structure for a fuel tank of a third aspect of the present invention is the second aspect, wherein the damper shaft is positioned on the same side as the valve shaft relative to a lengthwise direction center of the fuel fill inlet member, and the damper contact piece has a guide surface that slopes in such a way as to come closer to the opening and closing valve heading away from the damper shaft.

The damper contact piece has the guide surface that slopes in such a way as to come closer to the opening and closing valve heading away from the damper shaft. Consequently, when the fuel nozzle contacts the guide surface when the fuel nozzle is inserted into the fuel fill inlet, the fuel nozzle is guided along the guide surface to a position far from the valve shaft of the opening and closing valve. The fuel nozzle pushes the opening and closing valve in a position far from the valve shaft, so it becomes possible to rotate the opening and closing valve to the open position with a small force.

The damper contact piece has the guide surface, so it is not necessary to dispose a new member having a guide surface and there is no increase in the number of parts.

A fuel filler structure for a fuel tank of a fourth aspect of the present invention is the third aspect, wherein the guide surface is a curved surface that is curved in such a way that its center in a width direction along the damper shaft is positioned on the insertion direction far side of both of its end portions in the width direction.

The guide surface is curved, so even if the fuel nozzle contacts the guide surface in a position offset from the center in the width direction when the fuel nozzle is inserted into the fuel fill inlet, the fuel nozzle can be guided to the center in the width direction.

Advantageous Effects of Invention

The present invention is given the above-described configurations, so when causing the opening and closing valve to close, it can be ensured that the opening and closing valve does not rapidly rotate to the closed position in which it closes the fuel fill inlet, and when causing the opening and closing valve to open, the opening and closing valve can be opened with a small force.

BEST MODES FOR CARRYING OUT THE INVENTION

Figure 1:
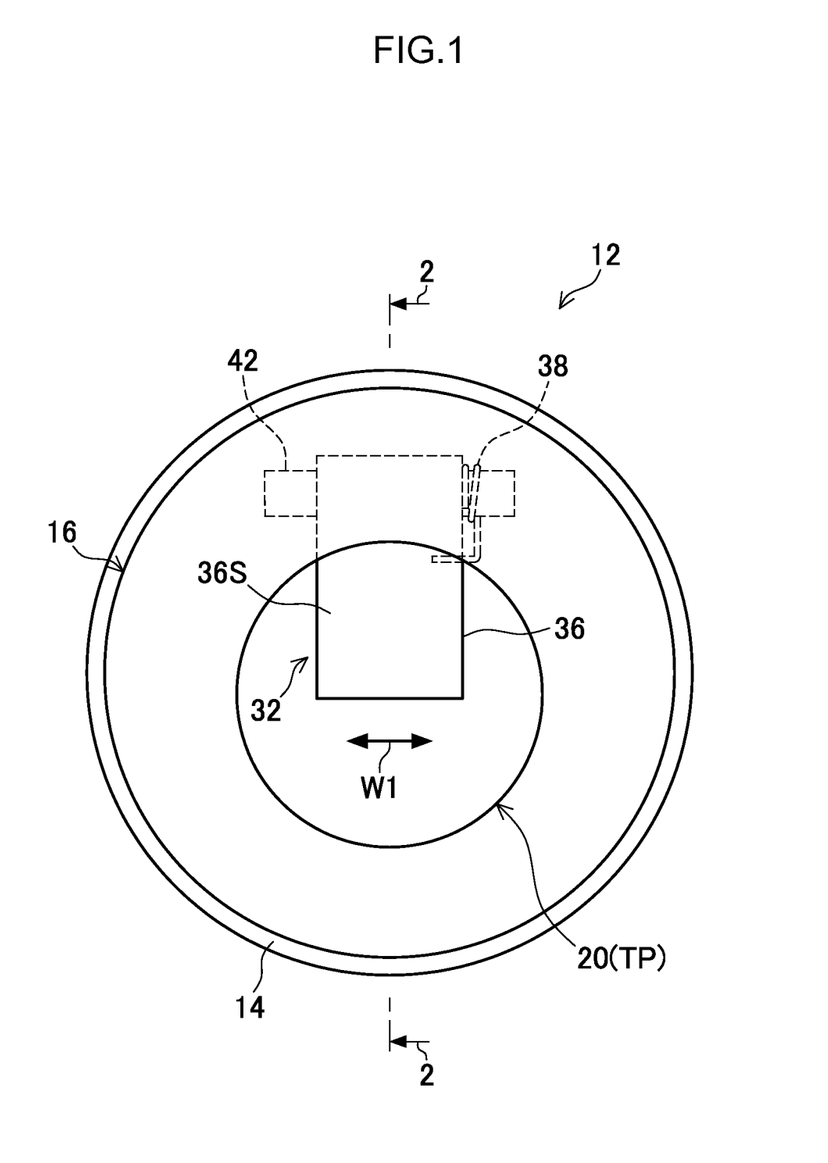
FIG. 1 is a front view showing a fuel filler structure for a fuel tank of a first embodiment of the present invention.

In FIG. 1, the external shape of a fuel filler structure 12 for a fuel tank (hereinafter simply called "the fuel filler structure") of a first embodiment of the present invention is shown in a state in which it is seen from the front. Furthermore, in FIG. 2, the fuel filler structure 12 is shown in a sectional view taken along line 2-2 in FIG. 1. As will be understood from FIG. 1, in the present embodiment, the fuel filler structure 12 does not need a cap for closing a fuel fill inlet.

Figure 2:
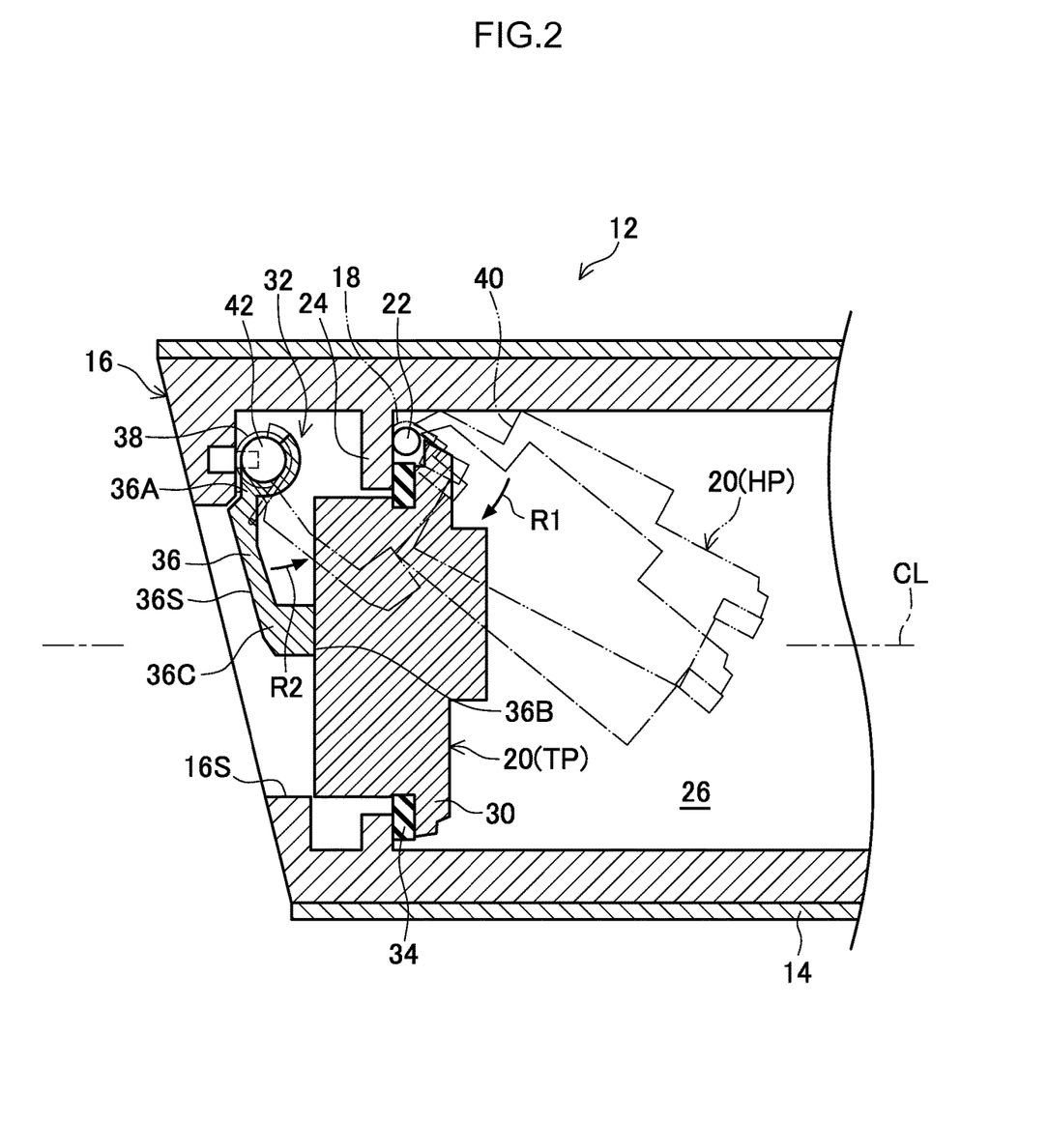
FIG. 2 is a sectional view, taken along line 2-2 of FIG. 1, showing the fuel filler structure for a fuel tank of the first embodiment of the present invention in a state in which a flapper valve is in a closed position.

The lower end of an inlet pipe 14 for fueling shown in FIG. 2 is connected to a non-illustrated fuel tank, and the fuel filler structure 12 is applied to the upper portion of the inlet pipe 14.

Figure 3:
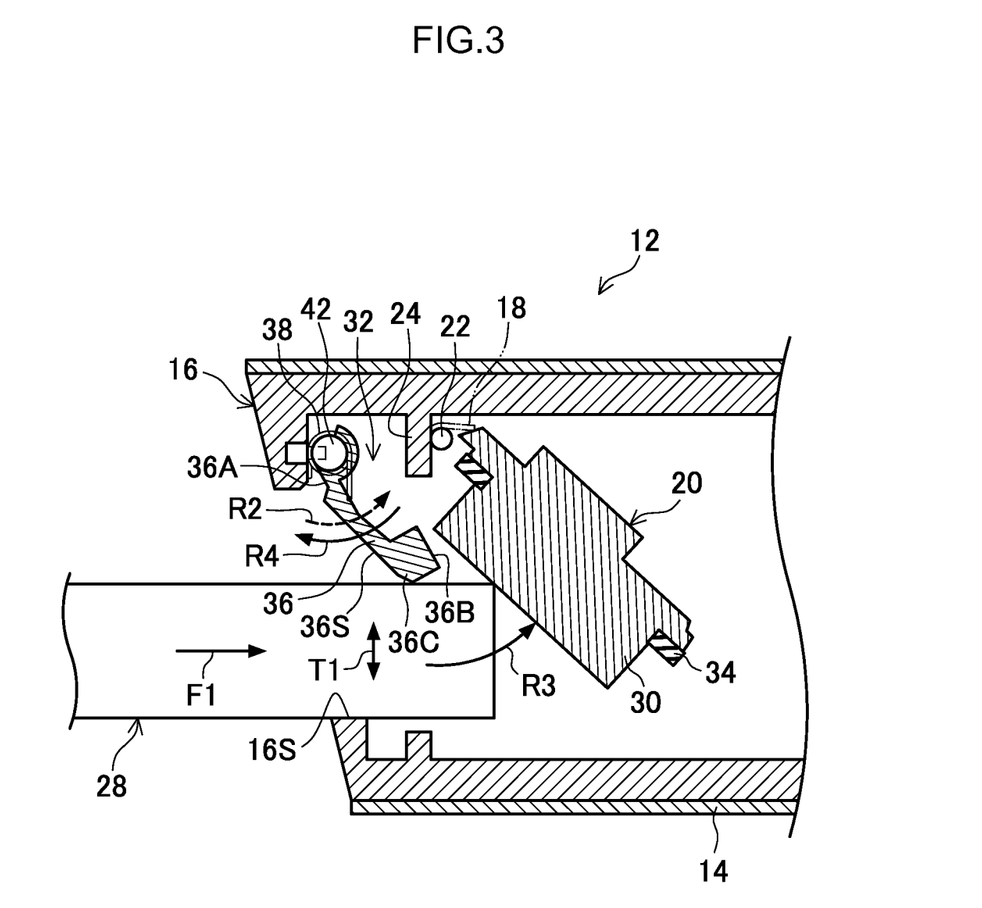
FIG. 3 is a sectional view showing the fuel filler structure for a fuel tank of the first embodiment of the present invention in a state in which the flapper valve is in the middle of moving from the closed position to an open position.
Figure 4:
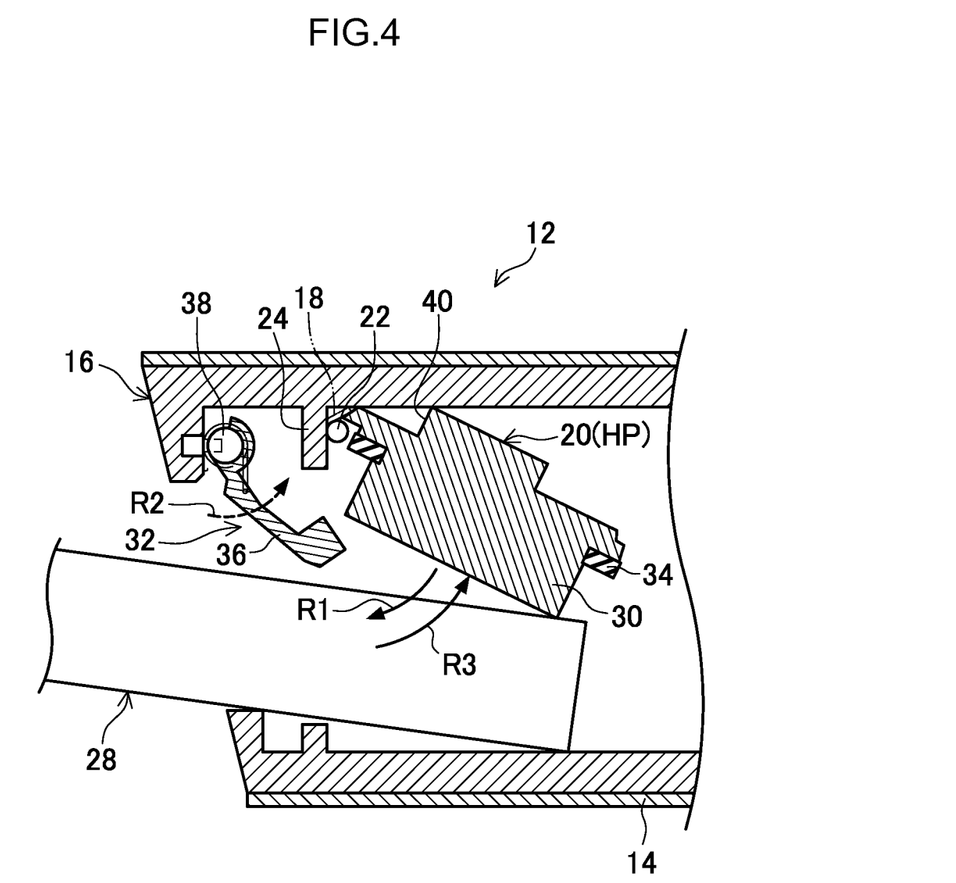
FIG. 4 is a sectional view showing the fuel filler structure for a fuel tank of the first embodiment of the present invention in a state in which the flapper valve is in the open position.
Figure 5:
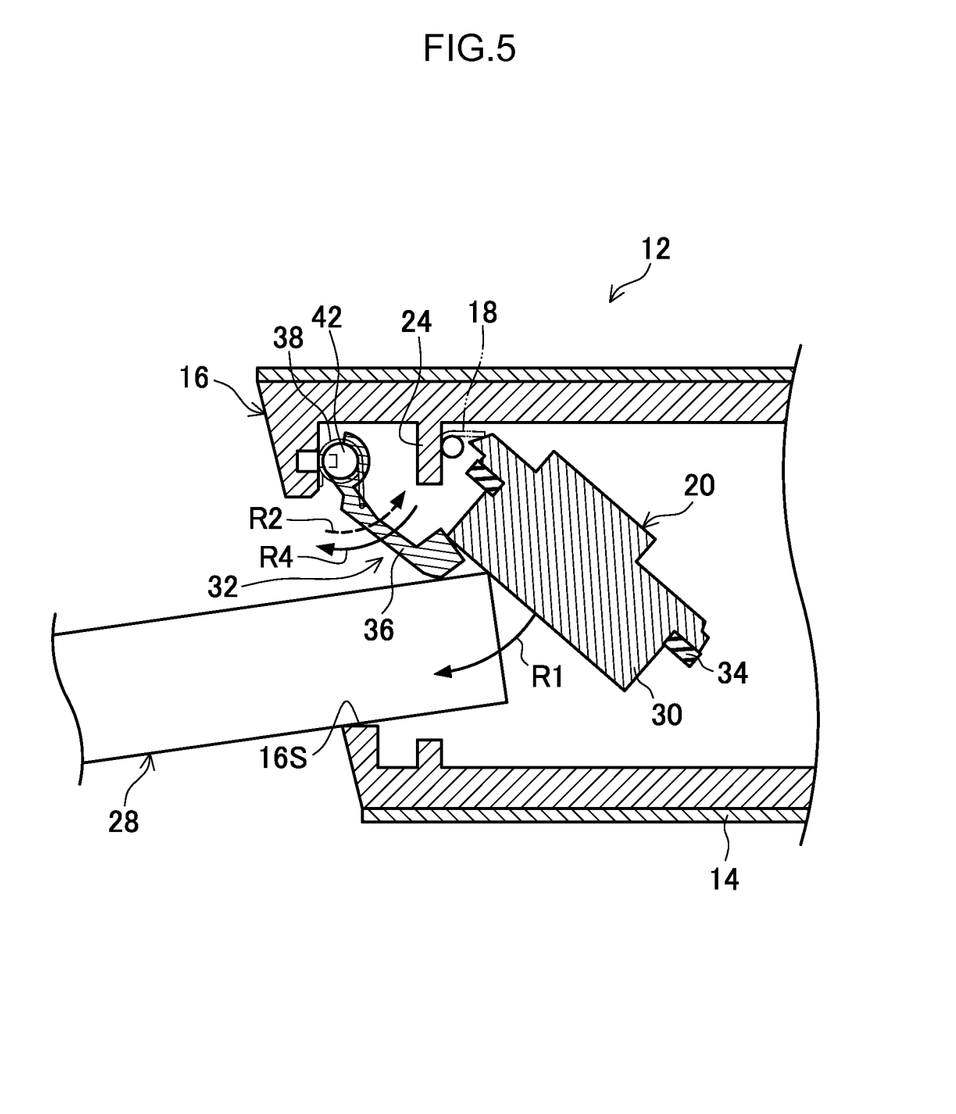
FIG. 5 is a sectional view showing the fuel filler structure for a fuel tank of the first embodiment of the present invention in a state in which the flapper valve is in the middle of moving from the open position to the closed position.

A substantially cylindrical fuel fill inlet member 16 is attached to the inside of the upper end of the inlet pipe 14. The interior of the fuel fill inlet member 16 serves as a fuel fill inlet 26. As shown in FIG. 3 to FIG. 5, a fuel nozzle 28 can be inserted into the fuel fill inlet 26 to fuel the fuel tank.

Hereinafter, when simply referring to the "far side", this will mean the side in the fuel fill inlet member 16 close to the fuel tank (the right side in FIG. 2 to FIG. 5), and when referring to the "near side", this will mean the opposite side, that is, the side from which the fuel nozzle 28 is inserted (the left side in FIG. 2 to FIG. 5). Furthermore, when referring to the "radial direction", this will mean the radial direction of the substantially cylindrical fuel fill inlet member 16. The axial direction (lengthwise direction) center of the fuel fill inlet member 16 is indicated by a centerline CL.

A flapper valve 20 is disposed in the upper portion of the inside (that is, the fuel fill inlet 26) of the fuel fill inlet member 16. The flapper valve 20 is an example of an opening and closing valve of the present invention.

The flapper valve 20 is rotatably attached to the fuel fill inlet member 16 by a hinge 22 disposed on the upper portion of the flapper valve 20 in FIG. 2. Additionally, the flapper valve 20 rotates between a closed position TP (the position indicated by the solid lines in FIG. 2) in which it closes the fuel fill inlet 26 and an open position HP (the position indicated by the long dashed double-short dashed lines in FIG, 2) in which it opens the fuel fill inlet 26. The hinge 22 is an example of a valve shaft of the present invention.

The flapper valve 20 has a valve body portion 30 that can close the fuel fill inlet 26. An annular gasket 34 is attached to the outer peripheral section of the valve body portion 30. The gasket 34 is made of fuel-resistant and elastic rubber, for example, and formed in an annular shape.

An annular contact ring 24 that surrounds the fuel fill inlet 26 is disposed in the fuel fill inlet member 16 on the near side of the flapper valve 20 in the closed position TP.

As will be understood from FIG. 2, when the flapper valve 20 is in the closed position TP, the gasket 34 of the flapper valve 20 contacts the contact ring 24 so that the range of rotation of the flapper valve 20 in the direction (the direction of arrow R1) heading toward the closed position TP is restricted. Additionally, the gasket 34 of the flapper valve 20 contacts the contact ring 24 all the way around from the far side, so that the state in which the flapper valve 20 closes the fuel fill inlet 26 is reliably maintained.

In contrast, when the flapper valve 20 is in the open position HP, the lower portion of the flapper valve 20—that is, the side opposite the side where the hinge 22 is disposed—moves greatly to the far side (the fuel tank side). This allows the fuel nozzle 28 to be inserted into the fuel fill inlet 26.

A stopper projection 40 is disposed on the back surface of the flapper valve 20. The stopper projection 40 restricts the range of rotation of the flapper valve 20 by contacting the inner peripheral surface of the inlet pipe 14 or the fuel fill inlet member 16 when the flapper valve 20 is in the open position HP.

A valve or the like for adjusting the pressure inside the fuel tank is disposed as needed on the flapper valve 20.

A flapper valve spring 18 is wound onto the hinge 22. The flapper valve spring 18 is an example of a valve biasing member of the present invention.

The flapper valve spring 18 biases the flapper valve 20 toward the closed position TP (the direction of arrow R1) to ensure that the fuel fill inlet 26 is not inadvertently opened. When the flapper valve 20 is pushed by the fuel nozzle 28 about to be inserted from the fuel fill inlet 26, the flapper valve 20 rotates to the open position HP counter to the biasing force of the flapper valve spring 18.

As shown in FIG. 2, a damper 32 is disposed in the fuel fill inlet member 16 in a position on the near side of the hinge 22. The damper 32 has a substantially cylindrical damper shaft 42. The damper shaft 42 is disposed on the same side as the hinge 22 relative to the centerline CL of the fuel fill inlet member 16 and parallel to the hinge 22.

Hereinafter, when simply referring to the "width direction," this will mean the direction along the damper shaft 42 and is indicated by arrow W1 in the drawings.

As will be understood from FIG. 2, one end portion 36A side of a damper contact piece 36 is rotatably attached to the damper shaft 42. The one end portion 36A is curved in a semicircular arc shape so as to conform to the outer peripheral surface of the damper shaft 42 and slides along the outer peripheral surface of the damper shaft 42 while holding onto the damper shaft 42. Because of this, the damper contact piece 36 can rotate about the damper shaft 42 without inadvertently coming off of it.

The damper contact piece 36 has a shape wherein it extends toward the radial direction inside and the far side from the one end portion 36A side to an intermediate portion 36C and then extends only toward the far side from the intermediate portion 36C to another end portion 36B side. The other end portion 36B of the damper contact piece 36 can contact, from the near side, the valve body portion 30 of the flapper valve 20 in the closed position TP.

The surface of the damper contact piece 36 on the near side ranging from the one end portion 36A to the intermediate portion 36C is a sloping surface 36S that comes closer to the flapper valve 20 heading away from the damper shaft 42. The sloping surface 36S is an example of a guide surface of the present invention.

A damper spring 38 is attached to the damper shaft 42. The damper spring 38 is an example of a damper biasing member of the present invention.

The damper spring 38 biases the damper contact piece 36 in the direction of arrow R2 in such a way as to be able to maintain a state in which the other end portion 36B side of the damper contact piece 36 is in contact with the valve body portion 30 from the near side. However, the spring force of the damper spring 38 is set in such a way that even if this biasing force acts on the flapper valve 20, the flapper valve 20 does not inadvertently rotate to the open position HP.

The damper shaft 42 is equipped with a damper mechanism. In the present embodiment, as shown in FIG. 5, when the flapper valve 20 rotates from the open position HP to the closed position TP, the damper contact piece 36 contacts the flapper valve 20 on the near side. Because the damper spring 38 biases the damper contact piece 36 in the direction of arrow R2, it accomplishes the action of suppressing rapid rotation of the flapper valve 20. That is, the damper spring 38 configures part of the damper mechanism.

Moreover, a damper mechanism utilizing the viscosity of a fluid is also used in addition to the damper spring 38. In the damper mechanism using the viscosity of a fluid, a viscous fluid is sealed inside, and a predetermined resistance is produced in the rotation of the damper contact piece 36 by fluid resistance when the viscous fluid passes through a non-illustrated small hole portion. Furthermore, a damper mechanism utilizing friction between members may also be used. In the damper mechanism using friction between members, members that slide when the damper contact piece 36 rotates are disposed beforehand, and a predetermined resistance is produced in the rotation of the damper contact piece 36 by the frictional resistance between these members.

A non-illustrated stopper is disposed in the fuel fill inlet member 16. As shown in FIG. 4, when the flapper valve 20 is in the open position HP, the damper contact piece 36 comes into contact with the stopper even if the damper contact piece 36 is not in contact with the valve body portion 30, so that the range of rotation of the damper contact piece 36 in the direction of arrow R2 is restricted.

A support surface 16S is formed in the fuel fill inlet member 16 in a position on the near side of the contact ring 24. As shown in FIG. 3, the support surface 16S can configure, between itself and the intermediate portion 36C of the damper contact piece 36 that has rotated in the direction of arrow R2, an interval equal to the diameter of the fuel nozzle 28. In particular, in the present embodiment, resistance is produced by the damper mechanism in the rotation of the damper contact piece 36 in the direction of arrow R2, so that the damper contact piece 36 rotates gently in the direction of arrow R2. This makes it possible for the fuel nozzle 28 that has been inserted (or is in the middle of being inserted) into the fuel fill inlet 26 to be sandwiched (but not sandwiched so strongly as to affect the insertion of the fuel nozzle 28) between part (the section from the other end portion 36B side to the intermediate portion 36C) of the damper contact piece 36 and the support surface 16S.

Next, the action of the fuel filler structure 12 of the present embodiment will be described.

In a normal state, as indicated by the solid lines in FIG. 2, the flapper valve 20 is in the closed position TP so that the fuel fill inlet 26 is closed.

When the fuel tank is to be fueled with fuel from the fuel nozzle 28, the flapper valve 20 is pushed by the fuel nozzle 28 and rotated to the open position HP. That is, first, a distal end of the fuel nozzle 28 is put up against the fuel fill inlet 26.

At this time, sometimes the distal end of the fuel nozzle 28 contacts the sloping surface 36S. The sloping surface 36S comes closer to the flapper valve 20 heading away from the damper shaft 42. For this reason, the distal end of the fuel nozzle 28 is guided along the sloping surface 36S so that it contacts the flapper valve 20 in a position far from the hinge 22. That is, the fuel nozzle 28 pushes the flapper valve 20 in a position far from the hinge 22, so compared to a configuration where the fuel nozzle 28 pushes the flapper valve 20 in a position near the hinge 22, the flapper valve 20 can be rotated to the open position HP with a small force.

Then, when the fuel nozzle 28 is moved in the direction of arrow F1, as shown in FIG. 3, the flapper valve 20 is pushed by the fuel nozzle 28 and starts to rotate to the open position HP (the direction of arrow R3). At this time, the support surface 16S supports the fuel nozzle 28, so the burden of supporting the fuel nozzle 28 borne by the person doing the fueling is lessened. Furthermore, the fuel nozzle 28 is sandwiched between part (the section from the other end portion 36B side to the intermediate portion 36C) of the damper contact piece 36 and the support surface 16S, so inadvertent movement of the fuel nozzle 28 in the up and down direction (the direction of arrow T1) is suppressed, and the fuel nozzle 28 can be stably inserted into the fuel fill inlet 26.

The damper contact piece 36 is biased in the direction of arrow R2 by the damper spring 38. However, the rotation of the damper contact piece 36 in the direction of arrow R2 receives resistance because of the damper mechanism, so rapid rotation of the damper contact piece 36 is suppressed. Consequently, if the rotation of the flapper valve 20 in the direction of arrow R3 is gentle, the damper contact piece 36 rotates in the direction of arrow R2 while maintaining a state in which the other end portion 36B side is in contact with the valve body portion 30 of the flapper valve 20. In contrast, if the rotation of the flapper valve 20 in the direction of arrow R3 is rapid, the damper contact piece 36 cannot follow the rotation of the flapper valve 20, and the valve body portion 30 and the damper contact piece 36 move away from one another (see FIG. 3). In any event, the damper contact piece 36 rotates in such a way as to follow after the valve body portion 30. Consequently, no damper action from the damper 32 to the flapper valve 20 is produced, that is, no resistance is produced in the rotation of the flapper valve 20.

As shown in FIG. 4, the stopper projection 40 of the flapper valve 20 contacts the inner peripheral surface of the fuel fill inlet member 16, so the position in which the rotation of the flapper valve 20 in the direction of arrow R3 is restricted is the open position HP of the flapper valve 20. At this time, the flapper valve 20 is completely open.

In the open position HP, the flapper valve 20 is away from the damper contact piece 36, and the flapper valve 20 and the damper contact piece 36 are not in contact with one another. Furthermore, the damper contact piece 36 receives the biasing force of the damper spring 38 and is in a position in which it has rotated in the direction of arrow R2.

When the fuel nozzle 28 is pulled out from the fuel fill inlet 26, the flapper valve 20 receives the biasing force of the flapper valve spring 18 and rotates toward the closed position TP (in the direction of arrow R1). As shown in FIG. 5, in the middle of this rotation, the flapper valve 20 contacts the damper contact piece 36.

Moreover, the flapper valve 20 tries to rotate in the direction of arrow R1, but it is in contact with the damper contact piece 36. Consequently, resistance acts from the damper contact piece 36 on the rotation of the flapper valve 20 in the direction of arrow R1. Consequently, although flapper valve 20 receives the biasing force of the flapper valve spring 18, the flapper valve 20 does not rapidly rotate; rather, it gently rotates to the closed position TP.

In particular, in the present embodiment, the damper 32 causes resistance to act on the rotation of the flapper valve 20 just before the flapper valve 20 reaches the closed position TP. Consequently, the flapper valve 20 is effectively suppressed from strongly hitting the contact ring 24.

As will be understood from the above description, in the fuel filler structure 12 of the present embodiment, when the flapper valve 20 is rotated to the closed position TP (closed), the flapper valve 20 receives the damper action resulting from the damper 32, so the flapper valve 20 does not rapidly rotate to the closed position TP. Additionally, when the flapper valve 20 is rotated to the open position HP (opened), it is ensured that the damper action resulting from the damper 32 does not act on the flapper valve 20, so that the flapper valve 20 can be rotated with a small force.

Figure 6:
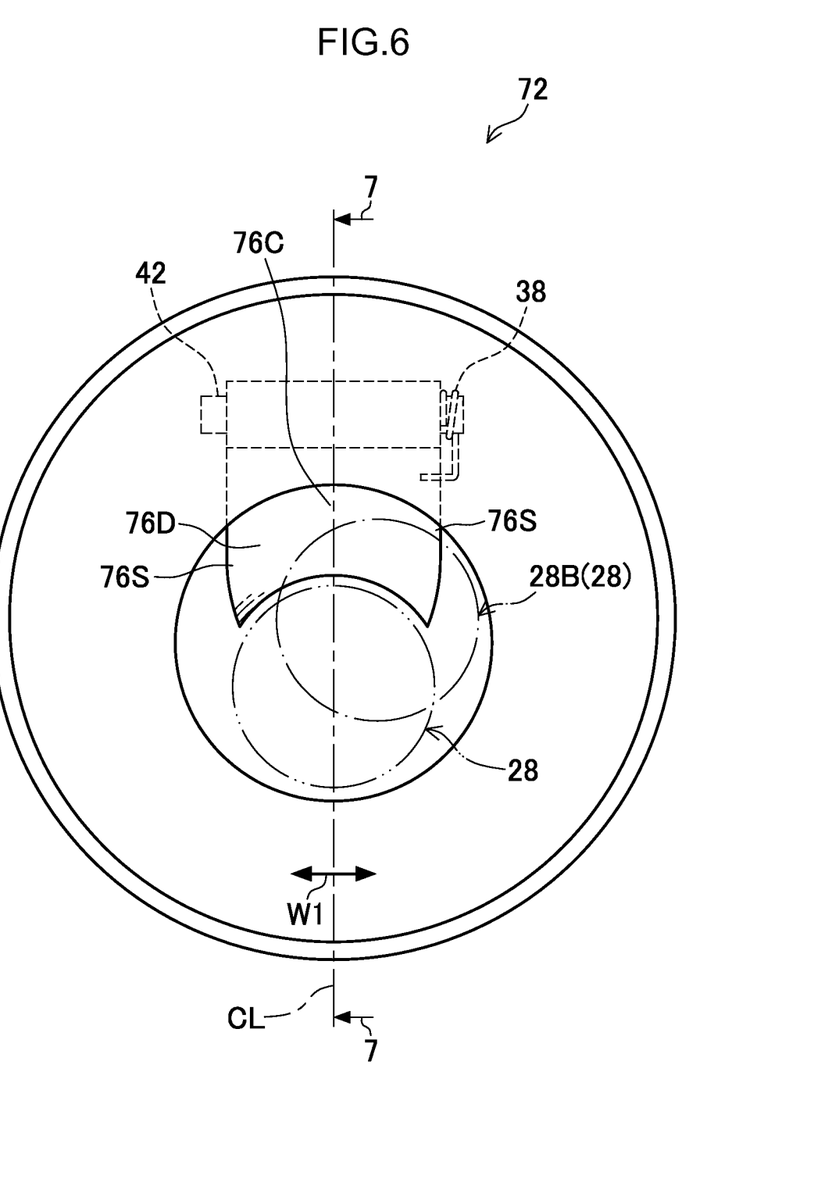
FIG. 6 is a front view showing a fuel filler structure for a fuel tank of a second embodiment of the present invention.

In FIG. 6 to FIG. 10, there is shown a fuel filler structure 72 of a second embodiment of the present invention. In the second embodiment, identical reference signs are assigned to constituent elements and members that are identical to those in the first embodiment, and detailed description of those constituent elements and members will be omitted. In FIG. 6, a centerline when the fuel filler structure 72 is seen from the near side is indicated by the long dashed short dashed line CL.

In the second embodiment, the shape of the damper contact piece differs from the first embodiment. That is, as shown in FIG. 6 and FIG. 7, on a damper contact piece 76 of the second embodiment, a curved surface 76D is disposed instead of the sloping surface 36S of the first embodiment (see FIG. 1 and FIG. 2).

The curved surface 76D is gently curved overall in such a way that its center section 76C (the section near the centerline CL) in the width direction is positioned most on the far side and both of its end sections 76S (the sections far from the centerline CL) in the width direction are positioned most on the near side.

Figure 7:
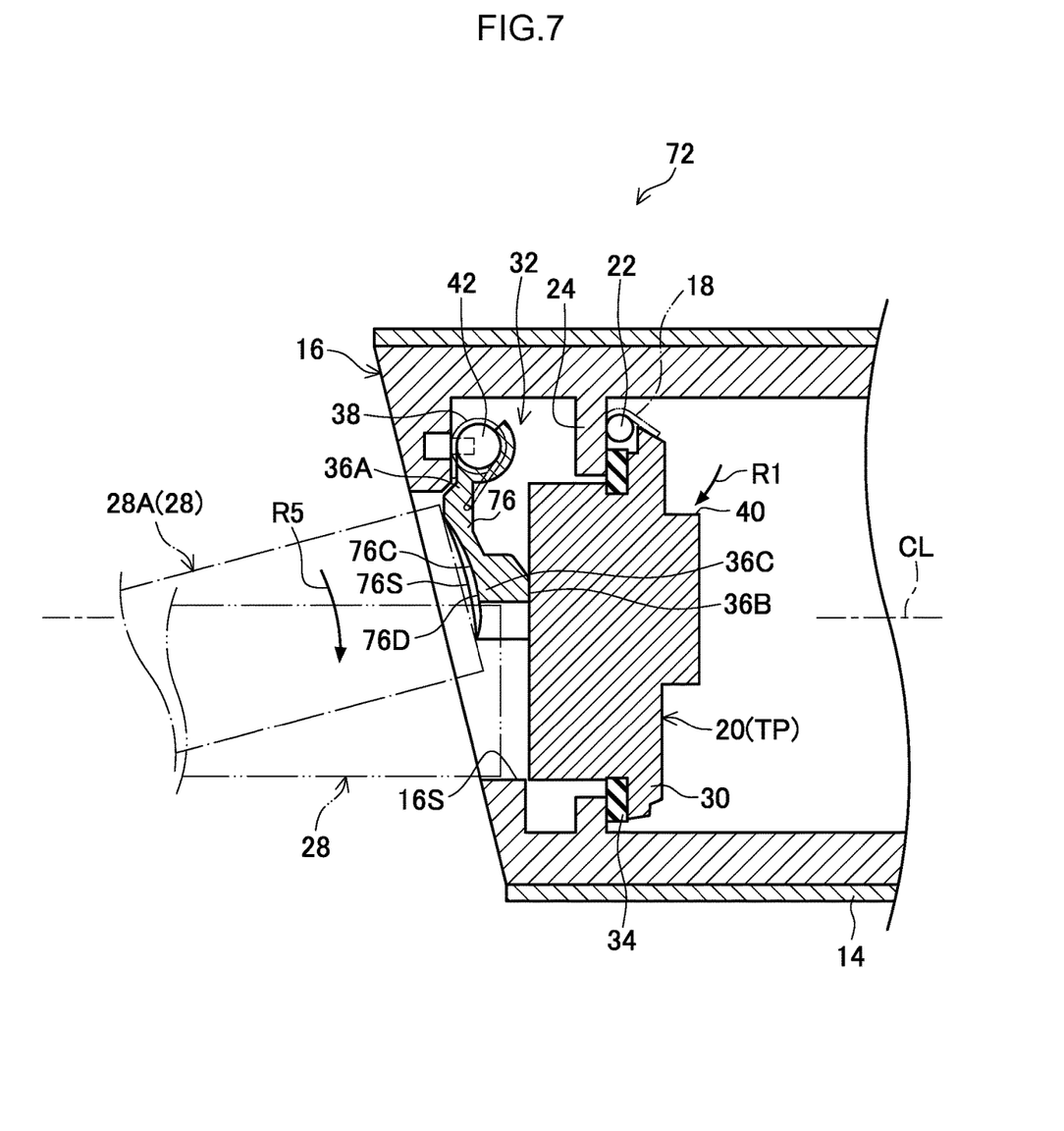
FIG. 7 is a sectional view, taken along line 7-7 of FIG. 6, showing the fuel filler structure for a fuel tank of the second embodiment of the present invention in a state in which the flapper valve is in the closed position.

Furthermore, whereas the sloping surface 36S of the first embodiment has a linear shape from the one end portion 36A side to the intermediate portion 36C as shown in the sectional view of FIG. 2, when seen in the sectional view of FIG. 7 the curved surface 76D of the second embodiment has a curved shape in which the curved surface 76D becomes a concave surface toward the far side from the one end portion 36A side to the intermediate portion 36C.

In the fuel filler structure 72 of the second embodiment given this configuration also, when the fuel nozzle 28 is inserted into the fuel fill inlet 26, the distal end of the fuel nozzle 28 is brought into contact with the curved surface 76D. Here, a case will be supposed where, like a fuel nozzle 28A indicated by the long dashed short dashed line in FIG. 7, the fuel nozzle 28 is inclined in such a way that its distal end contacts the upper portion of the curved surface 76D. The curved surface 76D slopes in such a way that it comes closer to the valve body portion 30 of the flapper valve 20 heading toward the far side, so the fuel nozzle 28 is guided in such a way as to come closer to the valve body portion 30 by moving to the far side along the curved surface 76D.

Moreover, in the second embodiment, the curved surface 76D is curved in such a way as to become a concave surface on the far side as seen in the cross section of FIG. 7. For this reason, when the fuel nozzle 38 moves in the direction of arrow F1 in a state in which the distal end of the fuel nozzle 28 is in contact with the curved surface 76D, a force in the direction of arrow R5 in FIG. 7 along the curved surface 76D acts on the fuel nozzle 28. Because of this, the above-described inclination of the fuel nozzle 28A is corrected in such a way that the fuel nozzle 28 becomes parallel to the centerline CL of the fuel fill inlet member 16 (see the fuel nozzle 28 indicated by the long dashed double-short dashed lines in FIG. 7 and the fuel nozzle 28 indicated by the solid lines in FIG. 8).

Furthermore, the curved surface 76D is curved in such a way that its center section in the width direction is positioned most on the far side and both of its end sections in the width direction are positioned most on the near side. Consequently, even when, like a fuel nozzle 28B indicated by the long dashed short dashed line in FIG. 6, the distal end of the fuel nozzle 28 contacts the curved surface 76D in a position offset from the center in the width direction, the fuel nozzle 28B can be guided in such a way that it moves toward the center in the width direction (see the fuel nozzle 28 in FIG. 6).

In this way, in the fuel filler structure 72 of the second embodiment, the effect wherein the fuel nozzle 28 is guided by the curved surface 76D to a position in which the fuel nozzle 28 reliably contacts the valve body portion 30 of the flapper valve 20 when the fuel nozzle 28 contacts the curved surface 76D is high.

Other than what has been described above, the fuel filler structure 72 of the second embodiment accomplishes the same action and effects as the fuel filler structure 12 of the first embodiment.

Figure 8:
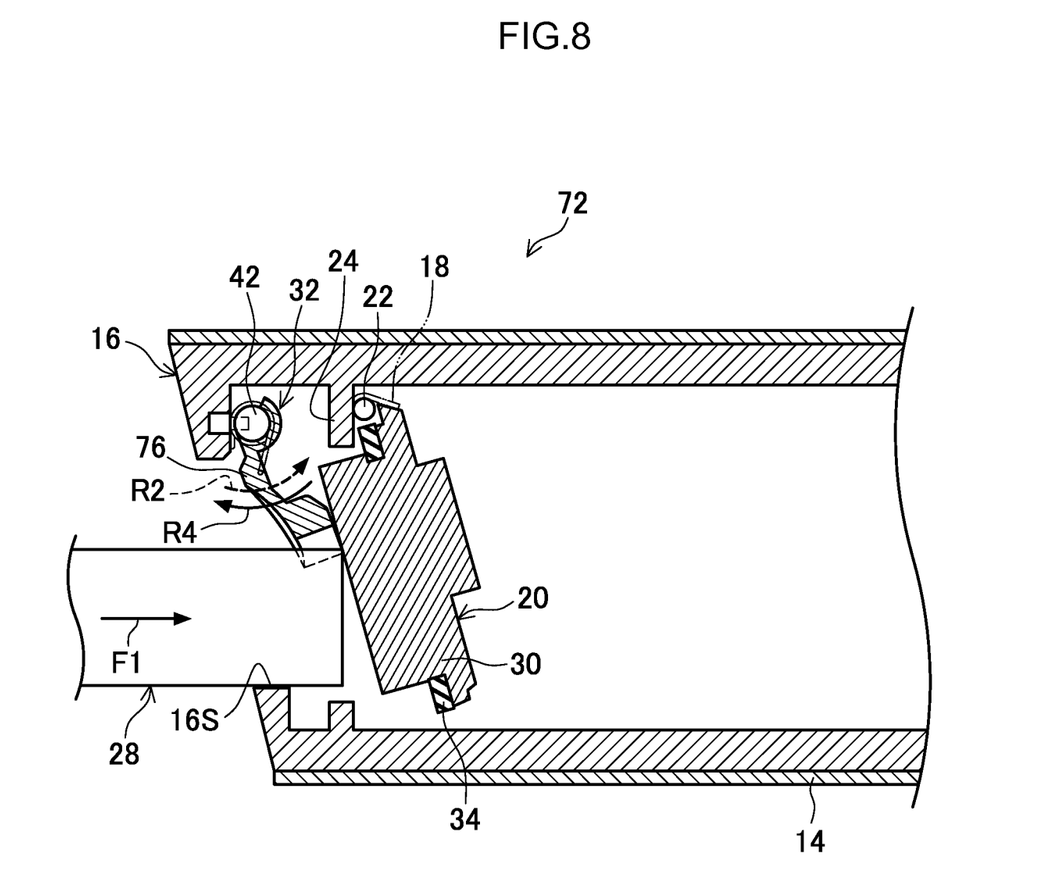
FIG. 8 is a sectional view showing the fuel filler structure for a fuel tank of the second embodiment of the present invention in a state in which the flapper valve is in the middle of moving from the closed position to the open position.

That is, when the fuel nozzle 28 is moved in the direction of arrow F1, as shown in FIG. 8, the flapper valve 20 is pushed by the fuel nozzle 28 and rotates to the open position HP. At this time, the damper action from the damper 32 to the flapper valve 20 does not take place.

Figure 9:
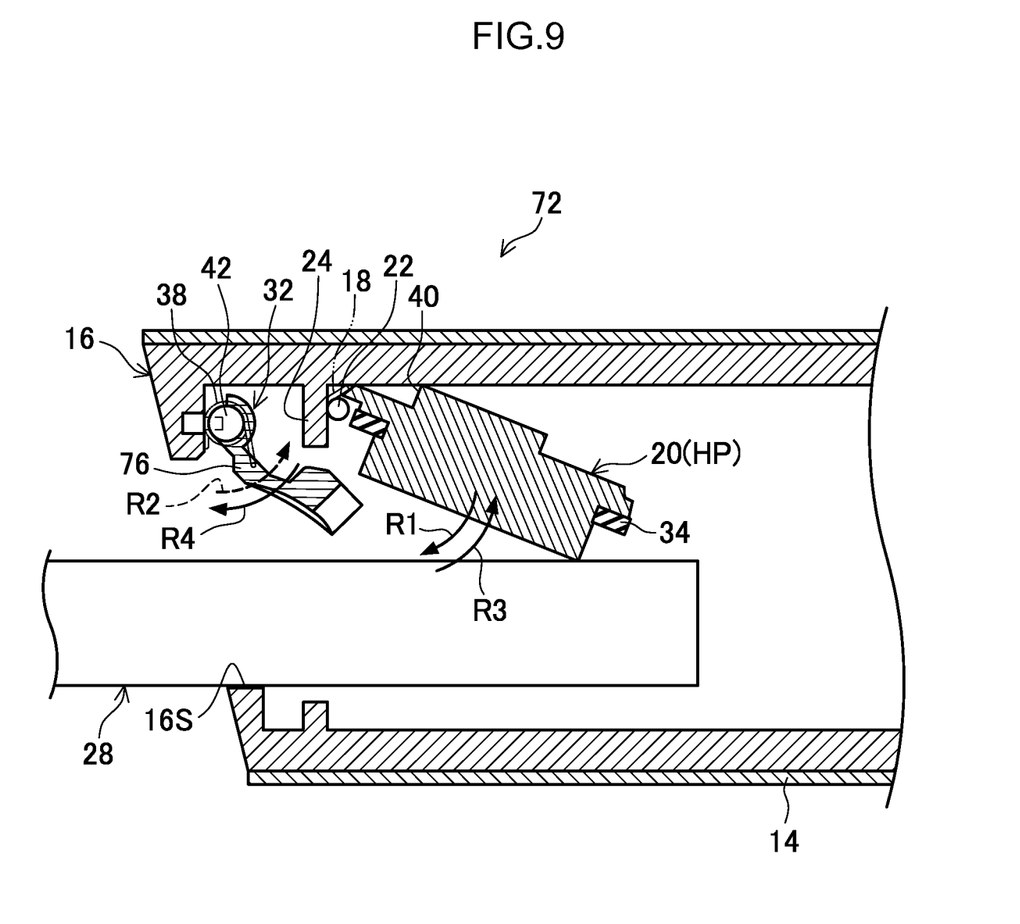
FIG. 9 is a sectional view showing the fuel filler structure for a fuel tank of the second embodiment of the present invention in a state in which the flapper valve is in the open position.

As shown in FIG. 9, when the flapper valve 20 is in the open position HP, the flapper valve 20 is away from the damper contact piece 76, and the flapper valve 20 and the damper contact piece 76 are not in contact with one another.

Figure 10:
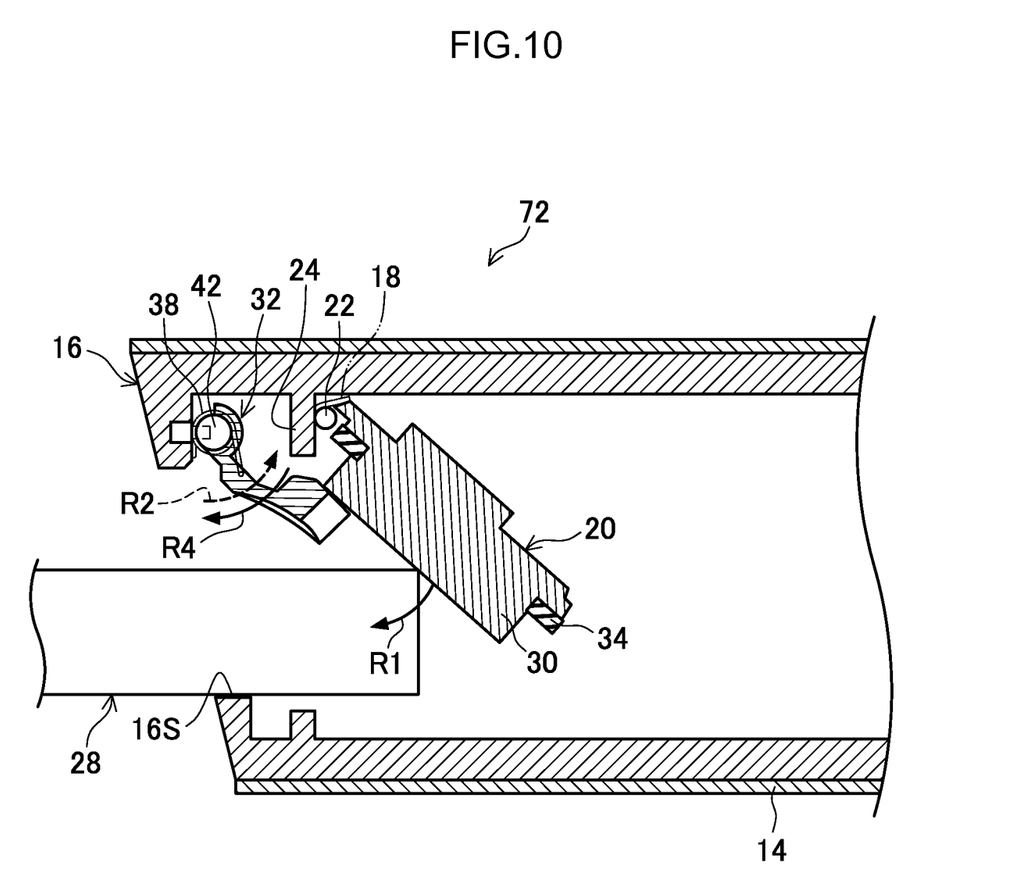
FIG. 10 is a sectional view showing the fuel filler structure for a fuel tank of the second embodiment of the present invention in a state in which the flapper valve is in the middle of moving from the open position to the closed position.

When the fuel nozzle 28 is pulled out from the fuel fill inlet 26, the flapper valve 20 receives the biasing force of the flapper valve spring 18 and rotates toward the closed position TP (in the direction of arrow R1), and in the middle of this rotation the flapper valve 20 contacts the damper contact piece 76.

Thereafter, resistance acts from the damper contact piece 76 on the rotation of the flapper valve 20 in the direction of arrow R1, so the flapper valve 20 gently rotates to the closed position TP.

In this way, in the fuel filler structure 72 of the second embodiment also, when the flapper valve 20 is rotated to the closed position TP, the flapper valve 20 receives the damper action resulting from the damper 32, so the flapper valve 20 does not rotate rapidly to the closed position TP. Furthermore, when the flapper valve 20 is rotated to the open position HP, it can be ensured that the damper action resulting from the damper 32 does not act on the flapper valve 20, so that the flapper valve 20 can be rotated with a small force.

As will be understood from FIG. 2 and so forth, in the fuel filler structure 12 of the first embodiment also, the sloping surface 36S comes closer to the valve body portion 30 of the flapper valve 20 heading toward the far side. For this reason, the sloping surface 36S accomplishes the effect of guiding the fuel nozzle 28, which contacts the sloping surface 36S when the fuel nozzle 28 is inserted into the fuel fill inlet 26, in such a way that the fuel nozzle 28 comes closer to the valve body portion 30 of the flapper valve 20.

In each of the embodiments described above, the damper 32 is disposed on the near side of the flapper valve 20. The potential for the damper 32 to contact the fuel inside the fuel fill inlet member 16 is low, so the structure and operation of the damper 32 can be stably maintained and the reliability of the damper 32 is increased.

In the above description, a structure equipped with the damper contact piece 36 that rotates about the damper shaft 42 was taken as an example of the damper of the present invention, but the damper is not limited to a member with a structure that rotates in this way. For example, the damper may also be disposed with a slide piece that slides between a position on the far side of the fuel fill inlet member 16 and a position on the near side of the fuel fill inlet member 16 and contacts the valve body portion 30 of the flapper valve 20 from the near side. However, with a structure that allows a slide piece to slide, a structure for allowing the slide piece to slide becomes necessary in the fuel fill inlet member 16. In contrast, with a structure that allows the damper contact piece 36 to rotate about the damper shaft 42 like in each of the embodiments described above, substantially it suffices to dispose the damper shaft 42 in the fuel fill inlet member 16.

Furthermore, with a structure that allows the damper contact piece 36 to rotate, it is not necessary for the damper shaft 42 (the rotational center of the damper contact piece 36) to be parallel to the hinge 22 (the rotational center of the flapper valve 20). However, if these are parallel, it becomes possible to allow the flapper valve 20 and the damper contact piece 36 to rotate smoothly while reliably bringing the damper contact piece 36 into contact with the flapper valve 20 in accompaniment with the rotation of the flapper valve 20.

REFERENCE SIGNS LIST

12 Fuel Filler Structure
16 Fuel Fill Inlet Member
20 Flapper Valve (Opening and Closing Valve)
22 Hinge (Valve Shaft)
26 Fuel Fill Inlet
28 Fuel Nozzle
32 Damper
36 Damper Contact Piece
36S Sloping Surface
38 Damper Spring (Damper Biasing Member)
42 Damper Shaft
72 Fuel Filler Structure
76 Damper Contact Piece
76D Curved Surface

The invention claimed is:
1. A fuel filler structure for a fuel tank, the fuel filler structure comprising:
a fuel fill inlet member that is equipped with a fuel fill inlet into which a fuel nozzle for fueling a fuel tank is inserted;
an opening and closing valve that opens and closes the fuel fill inlet;

a valve shaft that attaches the opening and closing valve to the fuel fill inlet member such that the opening and closing valve rotates between a closed position, in which the opening and closing valve closes the fuel fill inlet, and an open position, in which the opening and closing valve opens the fuel fill inlet as a result of being pushed by the fuel nozzle;

a valve biasing member that biases the opening and closing valve from the open position to the closed position; and a damper that, when the opening and closing valve rotates from the open position to the closed position: (i) contacts the opening and closing valve on a proximal side of the opening and closing valve in a direction in which the fuel nozzle is inserted into the fuel fill inlet member, and (ii) generates resistance in the rotation of the opening and closing valve, the damper includes:

a damper contact piece that contacts the opening and closing valve;

a damper shaft that is disposed on an insertion direction near side of, and parallel to, a rotational center of the valve shaft, the damper shaft being positioned on the same side as the valve shaft relative to a lengthwise direction center of the fuel fill inlet member, the damper shaft is disposed closer to the fuel fill inlet in the insertion direction than the opening and closing valve and the rotational center of the valve shaft, the damper shaft being configured to rotatably attach the damper contact piece to the fuel fill inlet member, and the damper contact piece has a guide surface that entirely slopes towards and closer to the opening and closing valve in a direction away from the damper shaft, the guide surface facing the fuel fill inlet in the insertion direction and being disposed adjacent to an upper surface defining an inner diameter of the fuel fill inlet member, the upper surface being attached to the valve shaft and the damper shaft; and a damper biasing member that biases the damper contact piece in a direction in which the damper contact piece contacts the opening and closing valve, which is in an opposite direction with respect to a direction in which the valve biasing member biases the opening and closing valve, the damper contact piece being configured to separate from the opening and closing valve upon rotation of the opening and closing valve from the closed position to the open position in the opposite direction, where the opening and closing valve is restricted from further rotating in the opposite direction in the open position, the damper biasing member biasing the opening and closing valve by a resistance generated from a biasing force after the fuel nozzle is removed from the fuel fill inlet.

2. The fuel filler structure for a fuel tank according to claim 1, wherein the guide surface is a curved surface that is curved in such a way that a center of the guide surface in a width direction along the damper shaft is positioned on an insertion direction far side of both of a pair of end portions of the guide surface in the width direction.

3. A fuel filler structure for a fuel tank, the fuel filler structure comprising:

a fuel fill inlet member that is equipped with a fuel fill inlet into which a fuel nozzle for fueling a fuel tank is inserted;

an opening and closing valve that opens and closes the fuel fill inlet;

a valve shaft that attaches the opening and closing valve to the fuel fill inlet member such that the opening and closing valve rotates between a closed position, in which the opening and closing valve closes the fuel fill inlet, and an open position, in which the opening and closing valve opens the fuel fill inlet as a result of being pushed by the fuel nozzle;

a valve biasing member that biases the opening and closing valve from the open position to the closed position; and a damper that, when the opening and closing valve rotates from the open position to the closed position: (i) contacts the opening and closing valve on a proximal side of the opening and closing valve in a direction in which the fuel nozzle is inserted into the fuel fill inlet member, and (ii) generates resistance in the rotation of the opening and closing valve, the damper includes:

a damper contact piece that contacts the opening and closing valve;

a damper shaft that is disposed on an insertion direction near side of, and parallel to, a rotational center of the valve shaft, the damper shaft is disposed closer to the fuel fill inlet in the insertion direction than the opening and closing valve and the rotational center of the valve shaft, and the damper shaft is configured to rotatably attach the damper contact piece to the fuel fill inlet member; and a damper biasing member that biases the damper contact piece in a direction in which the damper contact piece contacts the opening and closing valve, which is in an opposite direction with respect to a direction in which the valve biasing member biases the opening and closing valve, the damper contact piece being configured to separate from the opening and closing valve and the fuel nozzle upon rotation of the opening and closing valve from the closed position to the open position in the opposite direction, where the opening and closing valve is restricted from further rotating in the opposite direction in the open position by stopping a rotation of the damper contact piece, the damper biasing member biasing the opening and closing valve by a resistance generated from a biasing force after the fuel nozzle is removed from the fuel fill inlet, wherein:

the damper contact piece has a guide surface that entirely slopes towards and closer to the opening and closing valve in a direction away from the damper shaft, the guide surface facing the fuel fill inlet in the insertion direction and being disposed adjacent to an upper surface defining an inner diameter of the fuel fill inlet member, the upper surface being attached to the valve shaft and the damper shaft.

4. The fuel filler structure for a fuel tank according to claim 1, wherein the opening and closing valve includes a stopper projection protruding from a side of the opening and closing valve opposite from the a side facing the fuel fill inlet, the stopper projection contacting an inner peripheral surface of the fuel fill inlet member to stop rotation of the opening and closing valve and causing an opening of the fuel fill inlet to be restricted, such that the fuel nozzle is directed in a downward direction during insertion into the fuel fill inlet.

5. The fuel filler structure for a fuel tank according to claim 1, wherein the damper contact piece has a bottom surface facing a lower surface of the fuel fill inlet, the bottom surface of the damper contact piece having a concave semi-circular shape when viewed in a cross-section in the insertion direction.

\* \* \* \* \*